US011789937B2

(12) United States Patent
Lam et al.

(10) Patent No.: US 11,789,937 B2
(45) Date of Patent: Oct. 17, 2023

(54) METHOD AND APPARATUS FOR EXCHANGING DATA BETWEEN BLOCKCHAIN SYSTEM AND NON-BLOCKCHAIN SYSTEM

(71) Applicant: Hong Kong Applied Science and Technology Research Institute Company Limited, Hong Kong (HK)

(72) Inventors: Chan Fai Lam, Hong Kong (HK); Tin Lung Wong, Hong Kong (HK); Wei Lun Alan Cheung, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 153 days.

(21) Appl. No.: 17/588,188

(22) Filed: Jan. 28, 2022

(65) Prior Publication Data
US 2023/0244654 A1     Aug. 3, 2023

(51) Int. Cl.
*G06F 16/23*  (2019.01)
*G06F 9/54*   (2006.01)

(52) U.S. Cl.
CPC .......... *G06F 16/2379* (2019.01); *G06F 9/541* (2013.01)

(58) Field of Classification Search
None
See application file for complete search history.

(56) References Cited

U.S. PATENT DOCUMENTS

| 10,915,521 B2 | 2/2021 | Funke et al. |
| 2018/0144340 A1 | 5/2018 | Kinnaird et al. |
| 2019/0278852 A1 | 9/2019 | Jayachandran et al. |
| 2019/0385223 A1 | 12/2019 | Sharma |
| 2020/0151270 A1* | 5/2020 | Fox ................. H04L 9/3239 |
| 2020/0278959 A1 | 9/2020 | Ramgopal |
| 2020/0327498 A1 | 10/2020 | Weber et al. |
| 2021/0073913 A1* | 3/2021 | Ingargiola .............. G06Q 20/02 |

(Continued)

FOREIGN PATENT DOCUMENTS

| WO | 2020074456 A1 | 4/2020 |
| WO | 2020259352 A1 | 12/2020 |
| WO | 2021217928 A1 | 11/2021 |

OTHER PUBLICATIONS

International Search Report and Written Opinion of corresponding PCT application No. PCT/CN2022/079464 dated Oct. 26, 2022.

*Primary Examiner* — Richard L Bowen
(74) *Attorney, Agent, or Firm* — Idea Intellectual Limited; Margaret A. Burke; Sam T. Yip

(57) ABSTRACT

A computer-implement method for exchanging data between a blockchain system and a non-blockchain system is provided. The method includes: adding, by endorser nodes, periodically a plurality of status information of the endorser nodes to a smart contract of a blockchain ledger; receiving, by a first peer node, a transaction from an application; sending, by the first peer node, the received transaction to all endorser nodes; processing, by the endorser nodes, the transaction via the smart contract to obtain a plurality of endorsements; electing, by the endorser nodes, one of the endorser nodes as a target endorser node according to the status information of the endorser nodes; and transferring, by the target endorser node, the endorsed transaction to the non-blockchain system via an API corresponding to the non-blockchain system.

19 Claims, 12 Drawing Sheets

(56) References Cited

U.S. PATENT DOCUMENTS

2021/0083845 A1    3/2021  Sen et al.
2022/0131704 A1*  4/2022  Javaid .................... H04L 9/3247
2023/0216693 A1*  7/2023  Singh ..................... H04L 9/3268
                                                  713/176

* cited by examiner

METHOD AND APPARATUS FOR EXCHANGING DATA BETWEEN BLOCKCHAIN SYSTEM AND NON-BLOCKCHAIN SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to techniques for performing data exchanges between blockchain systems and non-blockchain systems.

BACKGROUND OF THE INVENTION

A blockchain is a distributed ledger system maintained by a set of peer devices. An application programming interface (API) is a set of machine instructions with specific invocation protocols that allows connections between computers and/or separate modules of machine instructions. An open API usually refers to a set of machine instructions having standardized invocation protocols that allow third-parties previously unknown to the host system to access the services and resources of the host system, which can be a non-blockchain system. The traditional information systems of many financial institutes are examples of non-blockchain systems that process fiat currency transactions and are accessed through open banking APIs.

A blockchain smart contract is a set of machine instructions executed by the blockchain system that can be used for sending transaction requests to an external system. However, due to the design of a blockchain system, a smart contract is executed by all peer devices; thus, more than one transaction requests could be sent to the external system instead of just one transaction request, causing erroneous transmission issues.

To prevent this issue, one existing approach is to use a middleman mechanism in a conventional framework linking the blockchain system and the non-blockchain system. The middleman monitors new transaction requests in the blockchain system and integrates each transaction request as one representative transaction request, then sends the representative transaction request to the non-blockchain system. However, if the middleman is unavailable or disconnected, all transactions fail.

Other prior arts offer ways to replace the middleman mechanism between the blockchain system and the non-blockchain system.

For example, U.S. Patent Application Publication No. 2020/0327498A1 disclosed a combination of a translator, a process instance, and a trigger to coordinate business processes on the blockchain and off the blockchain. The interface (trigger) has a number of functions such as querying the execution status of the process on the blockchain. However, the interface has no knowledge of when a trigger condition will be met; it must continuously check the process instance condition, hence incurring a lot of wasteful use of computing and network resources. The need for maintaining high quality data communication is another issue.

For a second example, U.S. Pat. No. 10,915,521B2 disclosed a blockchain gateway device as a node, intercepts a blockchain query, and reconciles the consistency of blockchain networks and legacy database. However, a dedicated blockchain gateway lacks redundancy and thus system resilience, causing the whole solution to fail when that node is malfunctional.

For a third example, U.S. Patent Application Publication No. 2018/0144340A1, disclosed is that when a blockchain processes a transaction, customized proof-of-work code selects a third party and forwards the proof-of-work results to it. However, this requires the third party to be capable of understanding blockchain and able to verify the proof-of-work result. Also, the proof-of-work mechanism consumes significant amount of resources, and the third party is required to pay a reward to the proof-of-work winning node.

For a fourth example, U.S. Patent Application Publication No. 2019/0385223A1 disclosed a way to facilitate fiat and digital currency transactions, integrate blockchain technology with core banking, and provide AML and KYC compliance capabilities in accordance with global standards across both bank-related and blockchain-enabled transactions and payments. However, this prior art still lacks system redundancy protection.

For a fifth example, U.S. Patent Application Publication No. 2021/0083845A1 disclosed a blockchain system with peer nodes that append blocks to the channel's chain, and for each valid transaction the write sets are committed to the current state's database. The client application is then notified that the transaction (invocation) is immutably appended to the chain, as well as whether the transaction was validated or invalidated. However, if the notification mechanism is malfunctioning, then no other component can assume responsibility to forward the transaction to the non-blockchain system. Furthermore, if multiple notification mechanisms are incorporated, then it results in the same problem: a single transaction is forwarded multiple times to non-blockchain system.

In addition to the shortcomings mentioned above, another common problem with many existing techniques of exchanging data between a blockchain system and a non-blockchain system require modification of the blockchain system itself.

SUMMARY OF THE INVENTION

In accordance to one aspect of the present invention, a computer-implement method for transferring data to a non-blockchain system through a blockchain system is provided. The blockchain system comprises a plurality of ordered nodes, one or more peer nodes and a plurality of endorser nodes, wherein each of the ordered nodes, the peer nodes, and the endorser nodes comprises one or more modules of machine instructions executed by at least a processor of an apparatus, wherein the processor is configured to maintain the same one blockchain ledger of the blockchain system. The method comprises: adding, by the endorser nodes, periodically a plurality of status information of the endorser nodes to a smart contract of the blockchain ledger, wherein each of the status information comprises a unique identifier (UID) of a corresponding endorser node; receiving, by a first peer node among the peer nodes, a transaction from an application; sending, by the first peer node, the received transaction to all endorser nodes; processing, by the endorser nodes, the transaction via the smart contract to obtain a plurality of endorsements; determining, by the endorser nodes, one of the endorser nodes as a target endorser node according to the status information of the endorser nodes; sending, by the endorser nodes, the endorsements and a plurality of election results made by the endorser nodes to the first peer node, wherein each of the election results comprises a target UID of the target endorser node determined by the corresponding endorser node; and transferring, by the target endorser node, the endorsed transaction to the non-blockchain system via an application programming interface (API) corresponding to the non-blockchain system after the endorsed transaction is added to the blockchain ledger.

In accordance to another aspect of the present invention, provided is an apparatus within a blockchain system for performing the afore-described data exchange between the blockchain system and a non-blockchain system, and the apparatus comprises a processor configured to execute machine instructions to implement the method described above.

In accordance to another aspect of the present invention, a blockchain system for performing the afore-described data exchange between the blockchain system and a non-blockchain system is provided, and the blockchain system comprises one or more processors configured to execute machine instructions to implement the method described above.

BRIEF DESCRIPTION OF THE DRAWINGS

Embodiments of the invention are described in more details hereinafter with reference to the drawings, in which.

DETAILED DESCRIPTION

In the following description, methods and apparatuses for data exchange between a blockchain system and a non-blockchain system, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
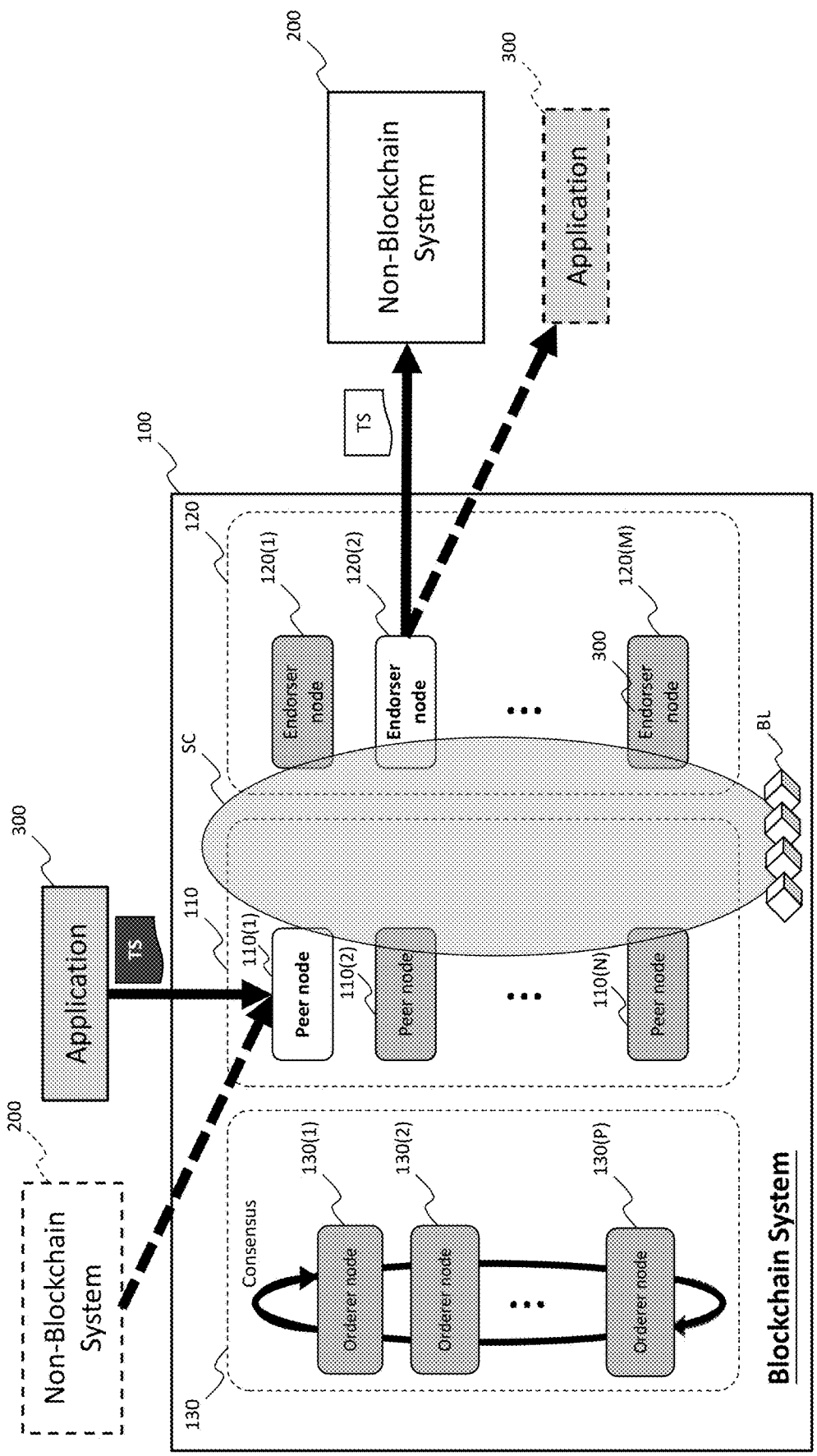
FIG. 1 depicts a block diagram illustrating a blockchain system performing a transaction transfer across the blockchain system and a non-blockchain system in accordance with one embodiment of the present invention.

Referring to FIG. 1 for the following description. In accordance with various embodiments of the present invention, provided is a blockchain system 100 includes one or more peer nodes 110, a plurality of endorser nodes 120, and a plurality of ordered nodes 130. The adjoining non-blockchain system 200 is a computer system not using blockchain technology. An application 300 that is incorporated in the invention is executed by an apparatus, which is an electronic device.

Each of the peer nodes 110(1) to 110(N), the endorser nodes 120(1) to 120(M), and the ordered nodes 130(1) to 130(P), wherein N, M, and P are integers, are modules of machine instructions executed by a processor 410 of an electronic device 400. Each of the processors 410 of the nodes (e.g., the peer nodes 110, the endorser nodes 120 and the ordered nodes 130) is configured to maintain a copy of the blockchain ledger BL of the blockchain system 100. The nodes communicate to each other via established wired and/or wireless data network connection. A smart contract SC is a snippet of machine instructions, meta data, and user data associated with the blockchain ledger, managed and executed by the processors of the peer nodes 110 and the endorser nodes 120.

Figure 2:
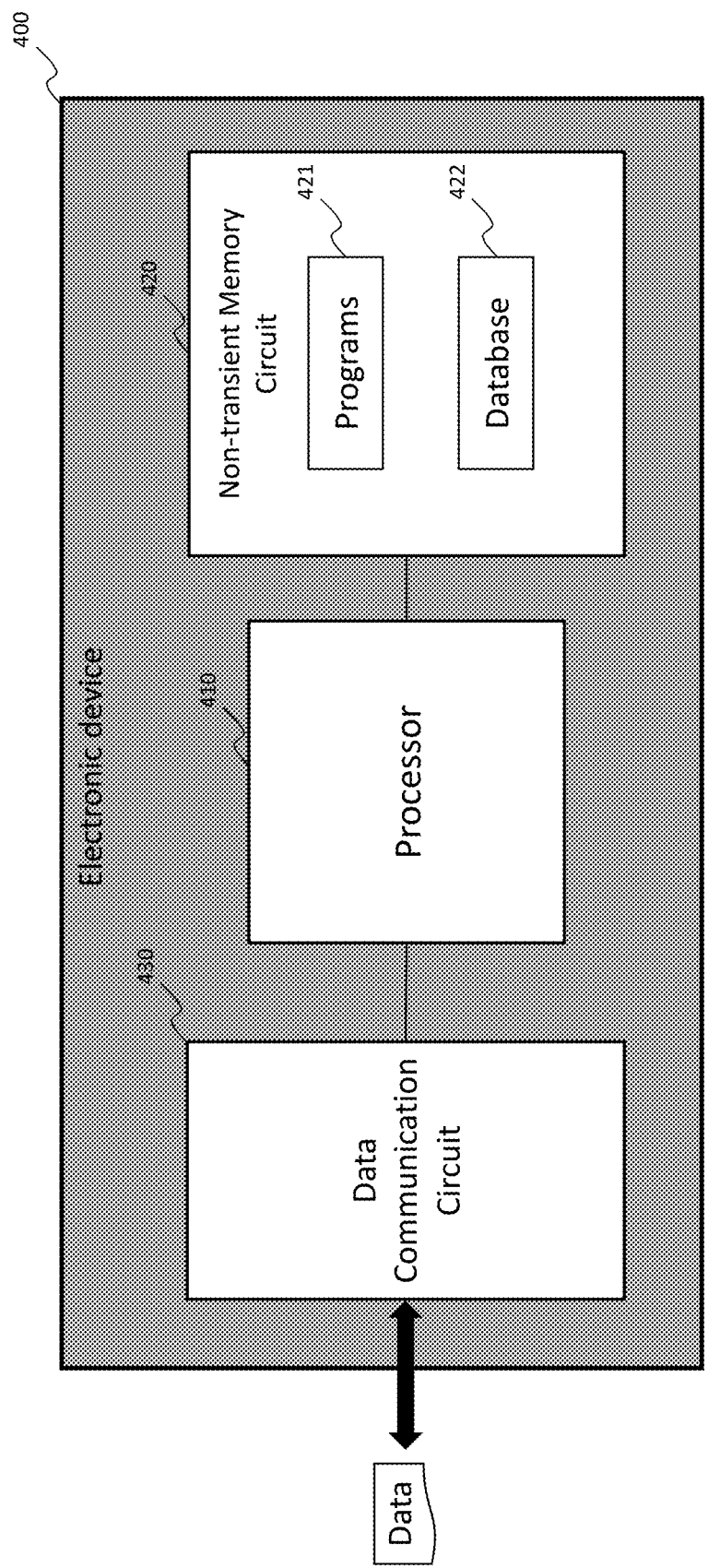
FIG. 2 depicts a block diagram illustrating an apparatus controlling nodes of the blockchain system.

In accordance with various embodiments of the present invention, FIG. 2 provides an electronic device 400 that includes a processor 410, a non-transient memory circuit 420 and a data communication circuit 430.

The non-transient memory circuit 420 is configured to store machine instructions 421, which may include the modules of machine instructions of the node, and to host the database 422, which may be used to store data, which may include meta data and user data of the blockchain ledger BL. The data communication circuit 130 is configured to establish the wired and/or wireless or data connection(s) between nodes for transferring data. The processor 410 executes the machine instructions 421 to implement the methods in accordance to the embodiments of the present invention.

Figure 3:
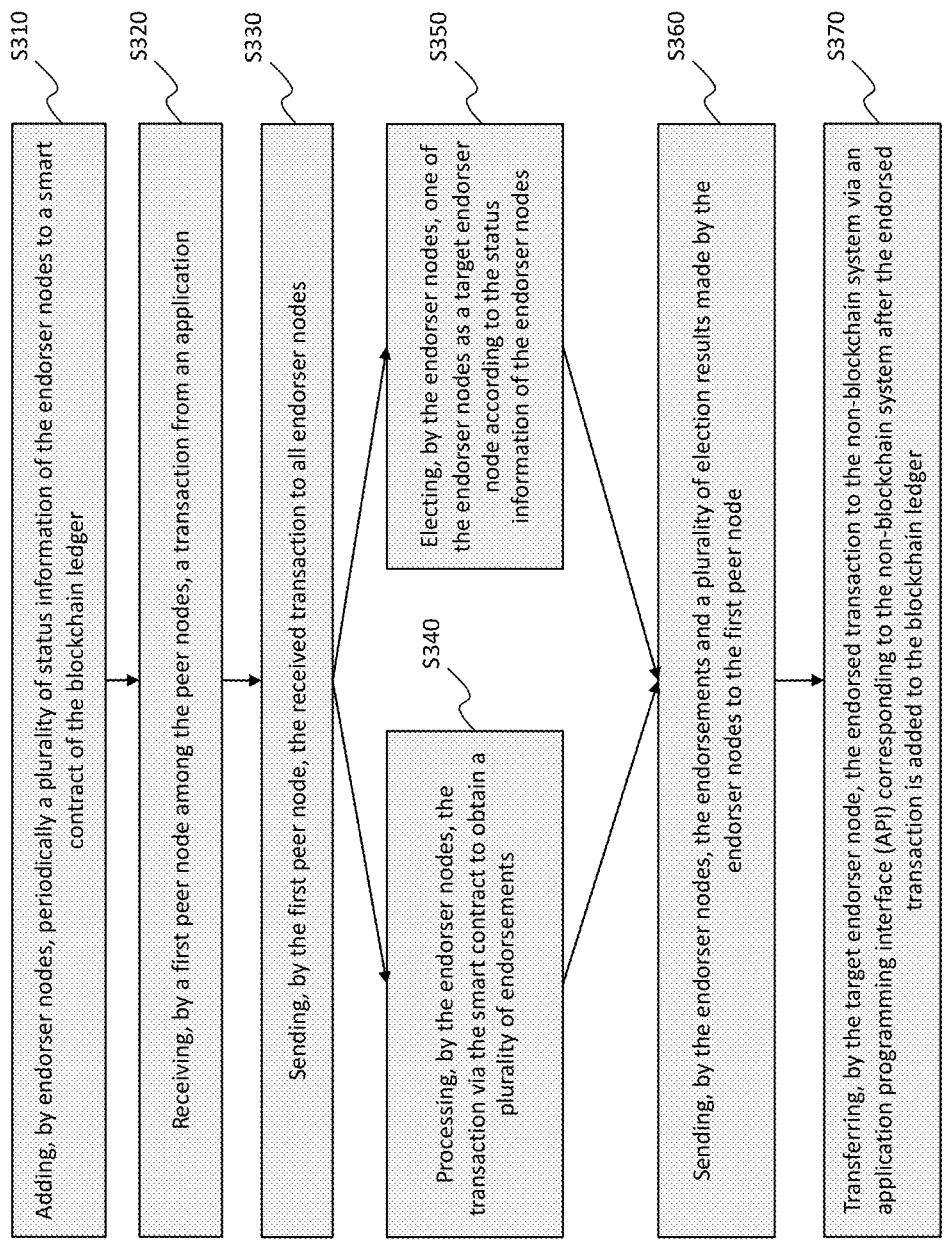
FIG. 3 depicts a flowchart of transferring a received transaction to the non-blockchain system through the blockchain system.
Figure 6A:
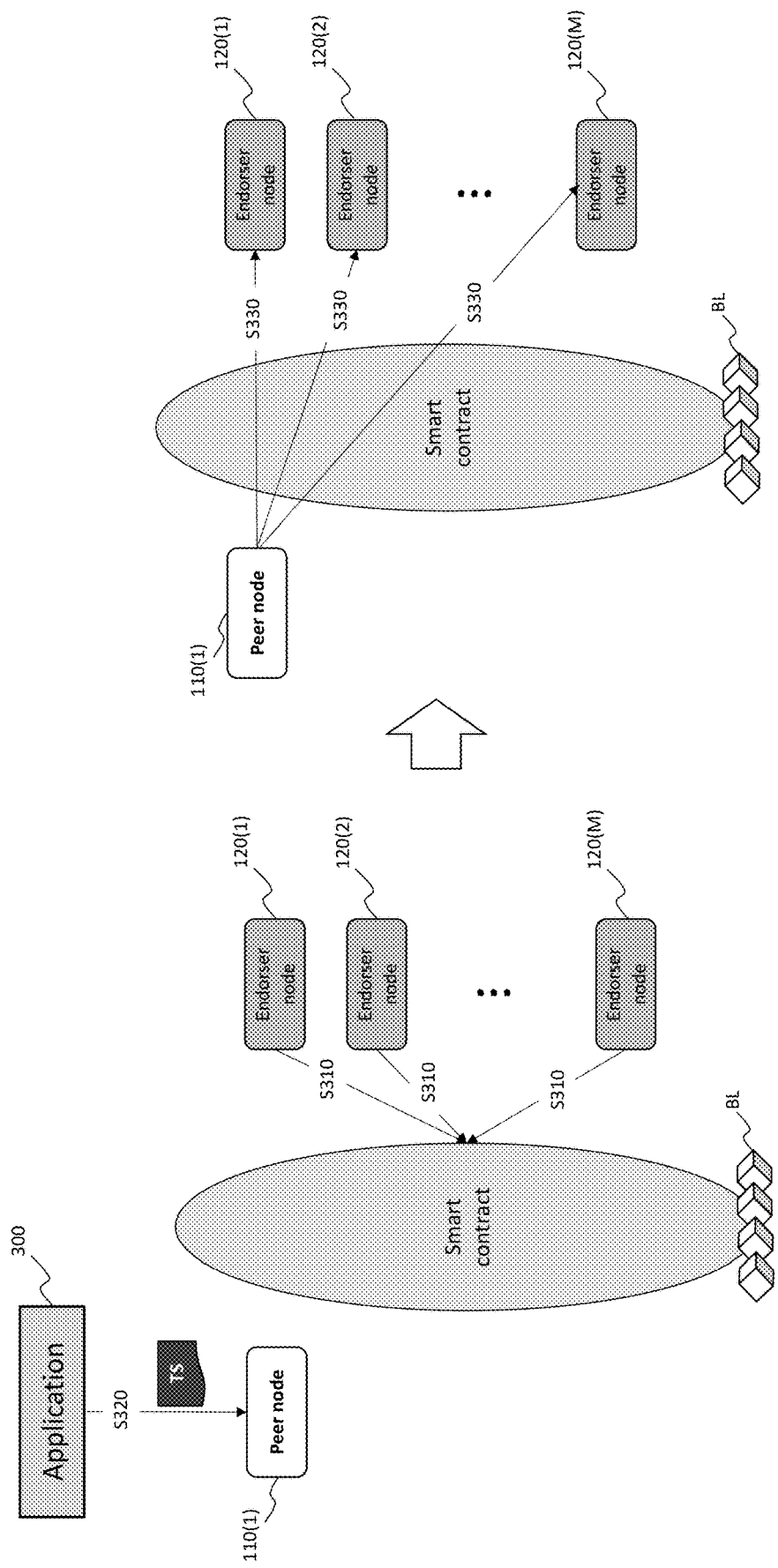
FIG. 6A to 6E depicts a schematic diagram illustrating the operation flow of the transaction transfer across the blockchain system and the non-blockchain system.

Referring to FIG. 3, in step S310, each of (the processor(s) of) the endorser nodes 120 periodically sends its status information to the smart contract SC associated with the blockchain ledger BL (as illustrated in the left half of FIG. 6A). Specifically, the status information of each of the endorser nodes 120 includes at least: a unique identifier (UID) of the endorser node; a network status; a network performance score or a system performance score; and a last update time.

The network performance score of one endorser node 120 can be determined according to the round-trip-time (e.g., total amount of time from sending a request to receiving the corresponding response) corresponding to a network connection between that endorser node 120 and the non-blockchain system 200. For example, a lower round-trip-time leads to a higher network performance score. Conversely, if the network connection between one endorser node 120 and the non-blockchain 200 is severed, the corresponding round-trip-time will be a much higher value (e.g., closed to the infinity), such that the corresponding network performance score will be greatly reduced. The last update time is recorded as the time when the smart contract SC updates the corresponding status information.

Each of the endorser nodes 120 possesses a UID that is accessible to the endorser node 120's processor. Further, the endorser node 120's processor, executing the module of machine instructions, reads the UID of the endorser node 120 and registers the UID to the blockchain ledger BL by transmitting it to the smart contract SC.

When the endorser nodes 120 execute the smart contract SC to elect an endorser node 120 having a specific UID (e.g., target UID), the smart contract SC in each of the endorser nodes 120 retrieves its own UID for matching. If the retrieved UID of a particular endorser node 120 matches the target UID, then that endorser node becomes the elected endorser node (or target endorser node). This way, the target endorser node may proceed with the operations or transactions. For example, after the endorser node 120(2) is elected as the target endorser node, it sends the endorsed transaction TS to the non-blockchain system 200 (e.g., invoking the appropriate API of the non-blockchain system 200).

In step S320, a first peer node 110(1) among the peer nodes 110 receives a transaction TS from an application 300 (as illustrated by the left portion of FIG. 6A). The application 300 can be executed by a computing device within or external to the blockchain system 100. The transaction can be, for example without limitation, a money transfer from a virtual currency account to a bank account of a fiat currency; a registry recordal of a transfer of title to an asset; and a purchase order sent to a merchant's point of sales system.

Next, in step S330, the first peer node 110(1) sends the received transaction TS to all endorser nodes 120 as specified by the configuration data in its smart contract SC (as shown by the right portion of FIG. 6A).

Figure 6B:
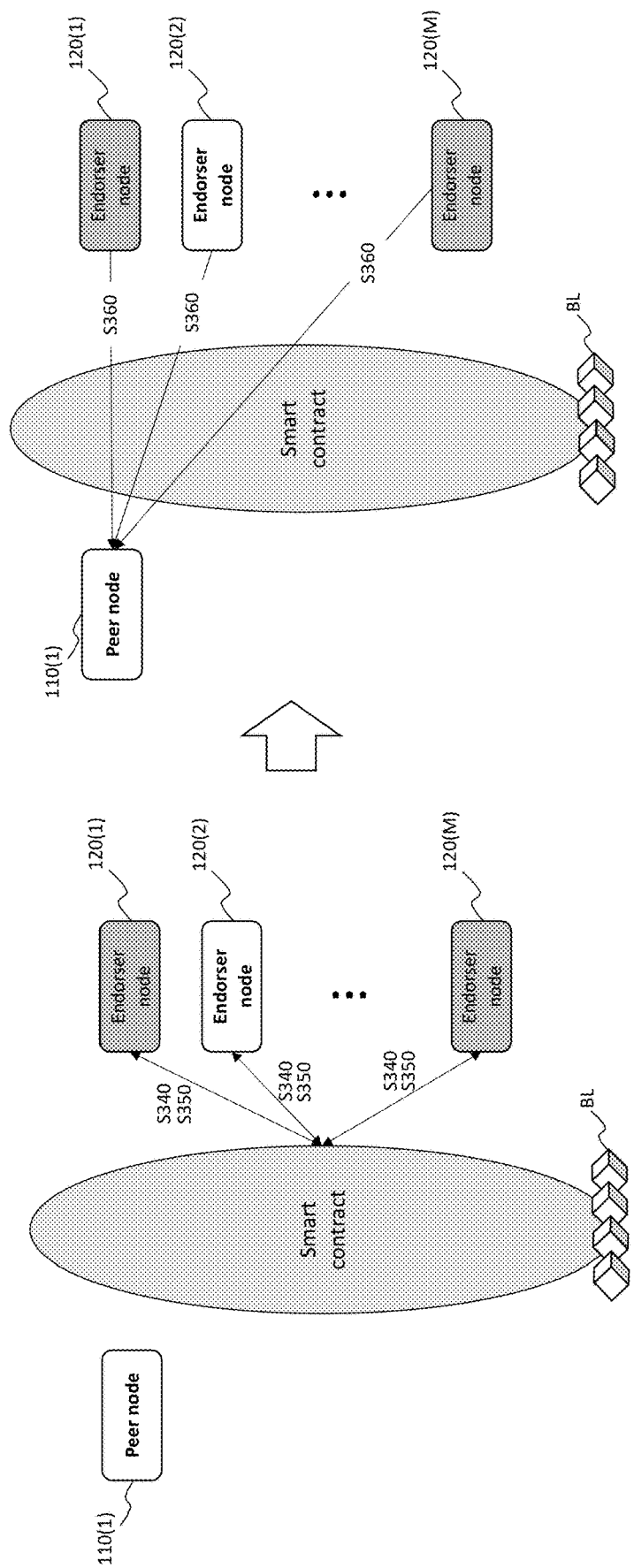

After receiving the transaction TS, in step S340 the endorser nodes 120 process the transaction TS and obtain a plurality of endorsements via the smart contract SC (as illustrated by the left portion of FIG. 6B). Then, in step S350, the endorser nodes 120 elect the one endorser node to serve as a target endorser node according to each endorser node's status information (as illustrated by the left portion of FIG. 6B). Specifically, each of the endorser nodes 120 elects the target endorser node according to each endorser node's last update time, network status, and network performance.

The elected target endorser node must meet all of the following conditions: the last update time of the target endorser node being higher than a dynamic time threshold; the target endorser node's network status being the "up" status; and the network performance score of the target endorser node being higher than the network performance scores of other endorser nodes. The dynamic time threshold is calculated by current time minus a timeout value.

In one embodiment of the election of target endorser node, each of the endorser nodes 120 first filters the one or more candidate target endorser nodes according to the "up" network status and the last update time. Then, each of the endorser nodes 120 selects whichever endorser node has the highest network performance as the target endorser node. In another embodiment, each of the endorser nodes 120 can select a particular endorser node with the highest system performance score as the target endorser node. In yet another embodiment, each of the endorser nodes 120 selects a particular endorser node having highest application performance score as the target endorser node from the candidates. The application performance score is determined according to the performance of processing operations related to the application 300.

Next, as illustrated by FIG. 6B, in step S360 the endorser nodes 120 send their endorsements and election results to the first peer node 110(1). Each of the endorser nodes sends its election result, including the target UID of the determined target endorser node, to the first peer node. For example, when an endorser node 120(2) is elected as the target endorser node by all the endorser nodes 120, the UID of that endorser node 120(2) is sent to the first peer node 110(1) as the target UID.

FIG. 4 depicts the mechanism of adding the endorsed transaction to the blockchain ledger BL. In step S410, after receiving the endorsements and a plurality of election results, the first peer node 110(1) sends the endorsed transaction TS to the ordered nodes 130 by verifying the endorsements and the election results (as illustrated by the left portion of FIG. 6C).

Figure 4A:
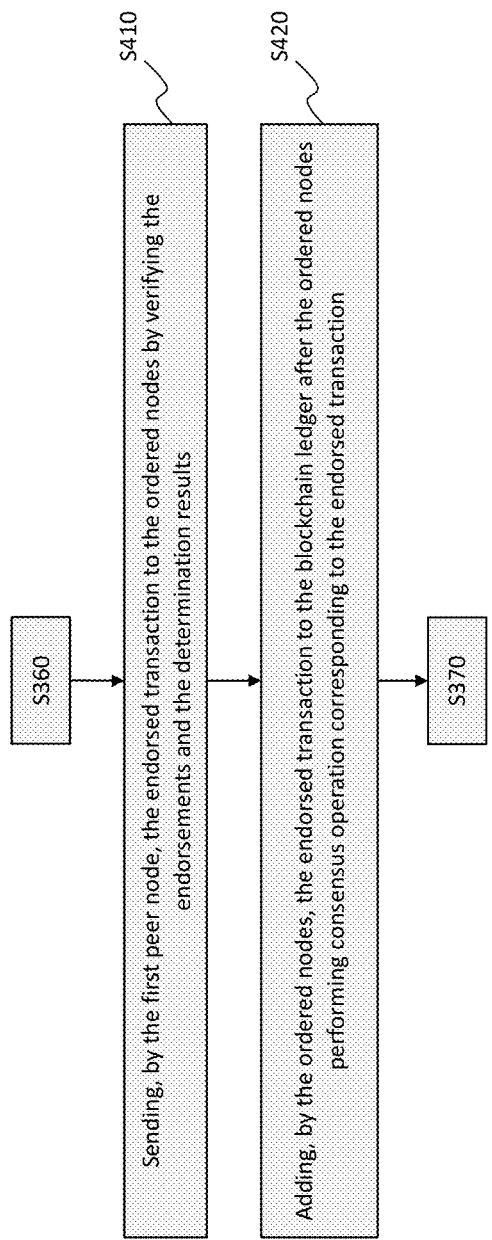
FIG. 4A depicts further steps of the flowchart in FIG. 3.
Figure 4B:
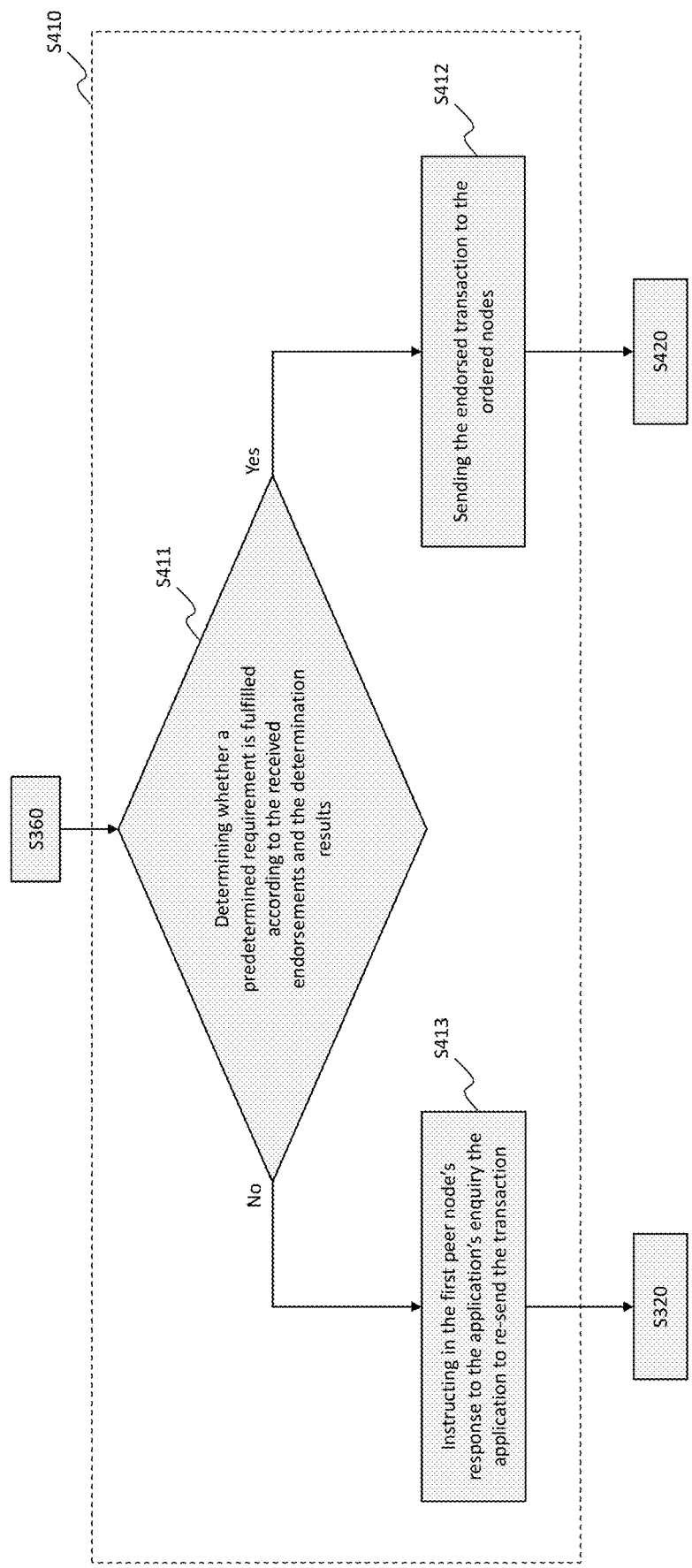
FIG. 4B depicts a flowchart of step S410 in FIG. 4A.

Referring to FIG. 4B, in step S411 the first peer node 110(1) confirms whether a predetermined requirement is fulfilled according to the received endorsements and the election results.

The conditions for fulfilling the predetermined requirement include: a total number of endorsements that is not lower than a minimum value (which can be customized); all the determined target endorser nodes being the same (e.g., all the received target UIDs are the same); and one of the endorsements has been obtained from the target endorser node.

If the predetermined requirement is fulfilled, in step S412 the first peer node 110(1) sends the endorsed transaction to the ordered nodes 130.

Otherwise, if the predetermined requirement is not fulfilled, in step S413 the first peer node 110(1) instructs the application 300 to re-send the transaction TS.

Figure 6C:
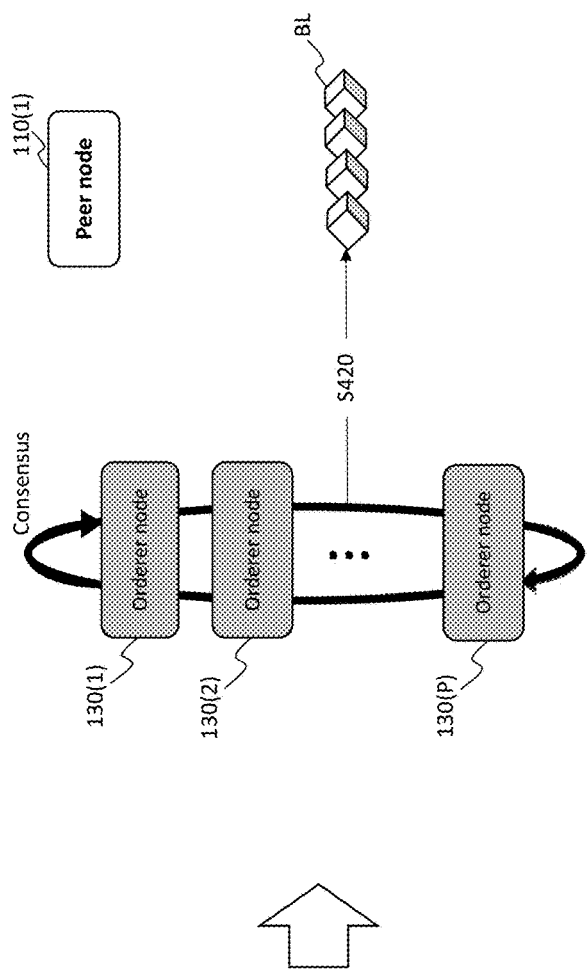
Figure 6C:
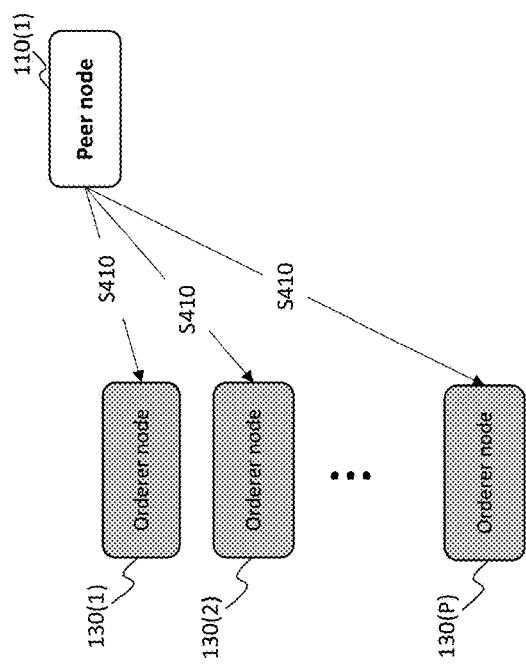

As shown in FIG. 4A, after receiving the endorsed transaction TS, in step S420 the ordered nodes 130 add the endorsed transaction TS to the blockchain ledger BL after the ordered nodes 130 performing/completing consensus operation corresponding to the endorsed transaction TS (illustrated by the right half of FIG. 6C).

Figure 6D:
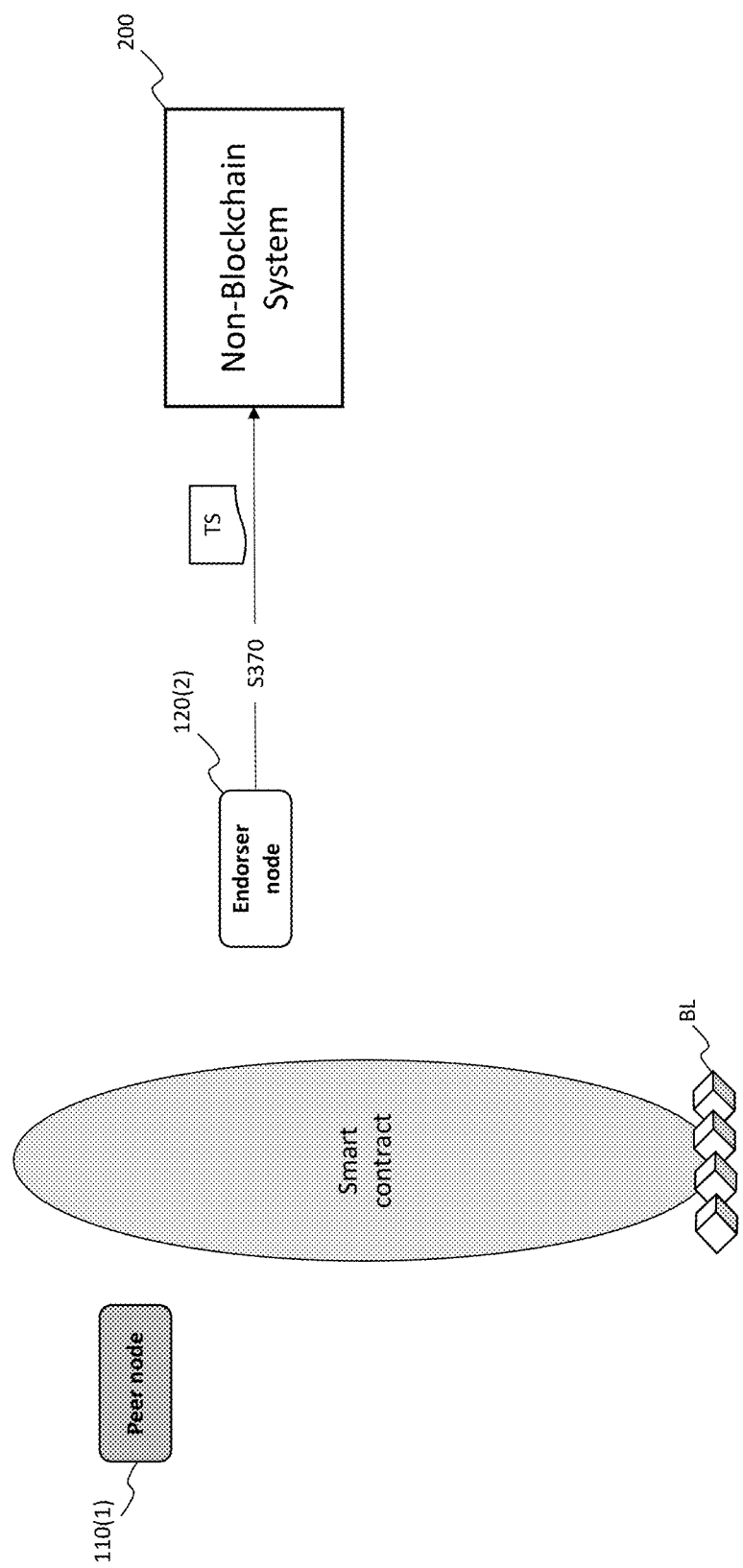

Returning to FIG. 3, after confirming that the endorsed transaction TS is added to the blockchain ledger BL, the first peer node 110(1) sends a response to the application 300 indicating that the endorsed transaction TS has been added to the blockchain ledger BL and the target endorser node 120(2) has been selected. The application 300 then polls (or enquires) the first peer node 110(1) to check if the transaction TS has been successfully transferred to the non-blockchain system 200. In step S370 the target endorser node 120(2) transfers the endorsed transaction TS to the non-blockchain system 200 via a corresponding API (as illustrated by FIG. 6D).

Figure 5:
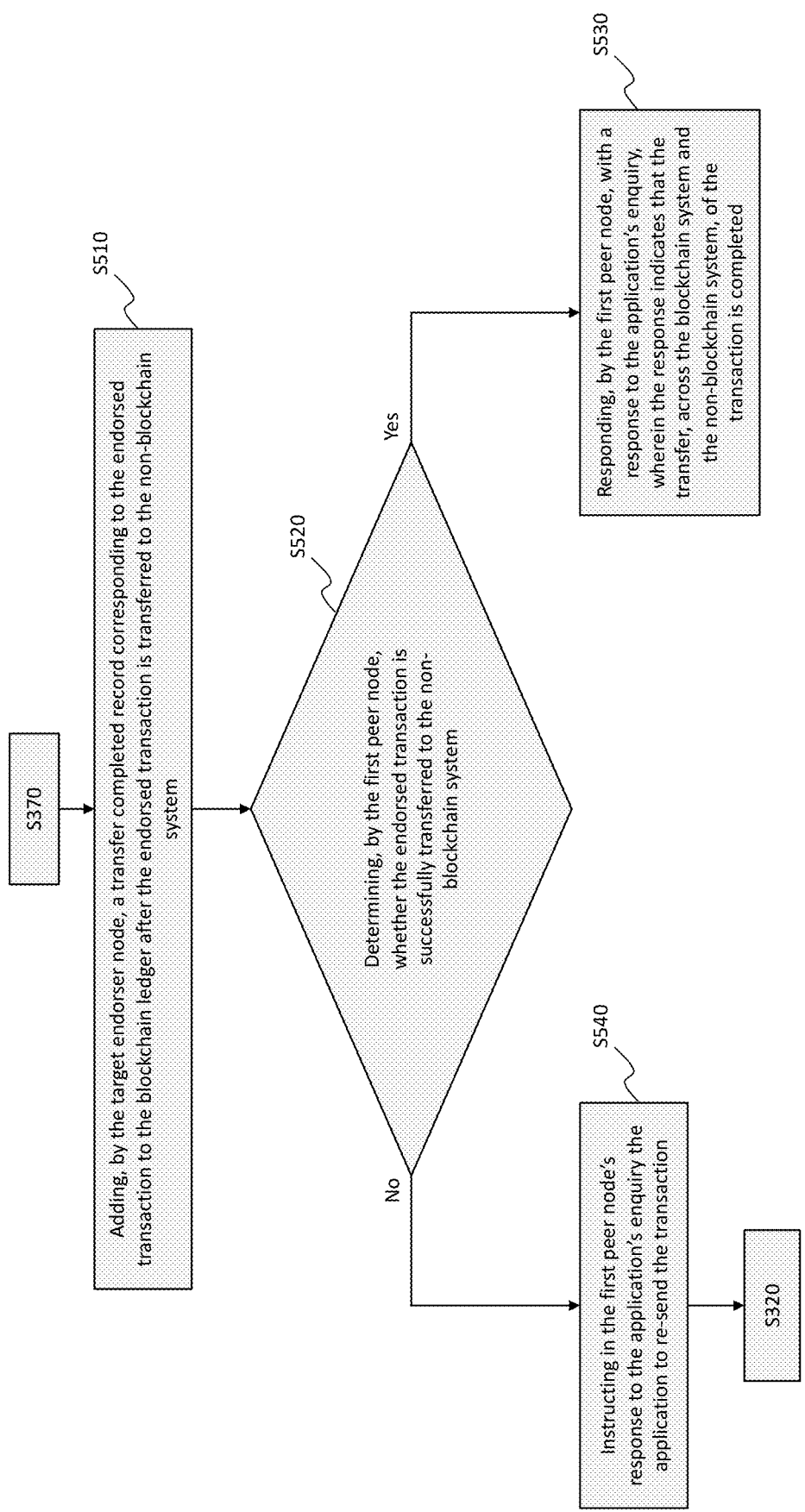
FIG. 5 depicts further steps of the flowchart in FIG. 3.
Figure 6E:
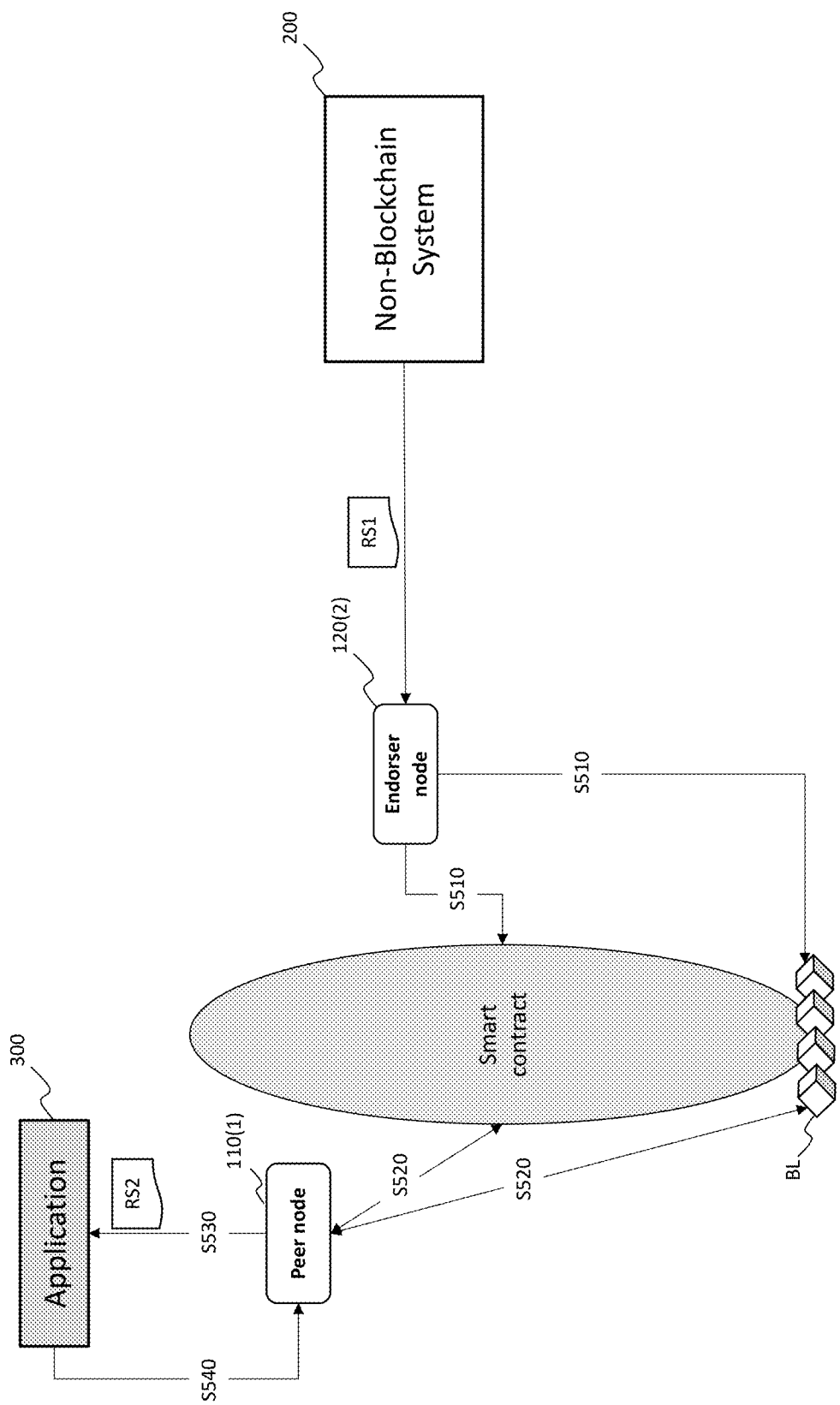

The following description refers to FIG. 5 and FIG. 6E. In step S510, after the endorsed transaction TS is transferred to the non-blockchain system 200, the target endorser node 120(2) adds to the blockchain ledger BL a transfer completed record corresponding to that endorsed transaction. As the application 300 enquires the first peer node 110(1), with the copy of the blockchain ledger BL of the first peer node 110(1) updated, application 300 is notified of the successful transfer of the transaction from the response of first peer node 110(1).

When the non-blockchain system 200 receives the endorsed transaction TS from the target endorser node 120(2), the non-blockchain system 200 sends a first response RS1 to the target endorser node 120(2). The first response RS1 indicates that the non-blockchain system 200 has successfully received the endorsed transaction TS. When the target endorser node 120(2) receives the first response RS1, the target endorser node 120(2) adds the transfer completed record corresponding to the endorsed transaction TS to the blockchain ledger BL through the smart contract SC.

When the endorsed transaction TS cannot be transferred to the non-blockchain system (e.g., the network connection is disconnected), the target endorser node 120(2) adds a transfer error record corresponding to the endorsed transaction TS to the blockchain ledger BL or the smart contract SC.

Next, in step S520, the first peer node 110(1) determines whether the endorsed transaction TS is successfully transferred to the non-blockchain system 200. For example, the first peer node 110(1) can determine whether the endorsed transaction TS has been successfully transferred to the non-blockchain system 200 by checking the record (e.g., the transfer completed record or transfer error record) related to the transfer of the endorsed transaction from the blockchain ledger BL or the smart contract SC.

If the endorsed transaction has been successfully transferred to the non-blockchain system 200, in step S530 the first peer node 110(1) responds (e.g., second response RS2) to the polling (enquiry) of the application 300, wherein the response RS2 indicates that the transaction TS has been transferred across the blockchain system 100 and the non-blockchain system 200.

If the endorsed transaction is not successfully transferred to the non-blockchain system 200, in step S540 the first peer node 110(1) responds as such to the enquiry by the application 300 and instructs the application 300 to re-send the transaction TS.

The step of determining whether the endorsed transaction has been successfully transferred to the non-blockchain system 200 includes following steps: if the transfer completed record has stored in the blockchain ledger BL (or the smart contract SC), the first peer node 110(1) determines that the endorsed transaction TS has been successfully transferred to the non-blockchain system 200; and if the transfer completed record has not been stored in the blockchain ledger BL (or the smart contract SC), the first peer node 110(1) determines that the endorsed transaction TS has not been successfully transferred to the non-blockchain system 200. Furthermore, if the transfer error record has been stored in the blockchain ledger BL (or the smart contract SC), the first peer node 110(1) determines that the endorsed transaction TS has not been successfully transferred to the non-blockchain system 200.

The blockchain system 100 has system resilience over any target endorser node that dies after being elected. Specifically, since the target endorser node is dead after being elected, it cannot transfer the endorsed transaction to the non-blockchain system 200. The transfer completed record will not be added in the blockchain ledger BL (or the smart contract SC). That is, during step S520, the first peer node 110(1) will determine that the endorsed transaction TS is not successfully transferred to the non-blockchain system 200 because the first peer node 110(1) cannot find the corresponding transfer completed record in the blockchain ledger BL (or the smart contract SC). The application 300 is then informed from the response of the first peer node 110(1) to its enquiry, and instructed to re-send the transaction (and proceed to step S320).

In one possible scenario, if the target endorser node 120(2) is dead after being elected, it cannot send the endorsement to the first peer node 110(1). Instead, the first peer node 110(1) will confirm that the predetermined requirement is not fulfilled (e.g., the first peer node 110(1) does not obtain one of the endorsements from the elected target endorser node). The application 300 is then informed from the response of the first peer node 110(1) to its enquiry, and instructed to re-send the transaction and proceed to step S320.

Furthermore, during step S350 for determining a new target endorser node, the old target endorser node will not be elected again, because the last update time of the old target endorser node will be lower than the dynamic time threshold, since the dead endorser node will no longer periodically update its status information to blockchain ledger BL.

In another scenario, the provided blockchain system 100 has greater system resilience over any target endorser node that cannot connect to the non-blockchain system after being elected. If the target endorser node cannot connect to the non-blockchain system 200 to transfer the endorsed transaction after being elected, the target endorser node 120(2) adds the transfer error record, corresponding to the endorsed transaction TS, to the blockchain ledger BL or the smart contract SC. Namely, during step S520, the first peer node 110(1) will determine that the endorsed transaction TS has not been successfully transferred to the non-blockchain system 200 because the first peer node 110(1) finds the corresponding transfer error record in the blockchain ledger BL (or the smart contract SC). Then, continuing to step S540, the application 300 is informed of this situation from the response of the first peer node 110(1) to its enquiry, and instructed to re-send the transaction (and proceed to step S320). Also, during step S350 to determine a new target endorser node, the old target endorser node will not be elected again since its network performance score will be very low (e.g., the round-trip-time is extremely high because the network connection is broken).

Though the above-described embodiments of methods are for transferring a transaction received from an application 300 to a non-blockchain system 200 through a blockchain system 100, the invention is not limited hereto. For example, in a further embodiment, another method for transferring a transaction received from a non-blockchain system 200 to an application 300 through a blockchain system 100 is provided.

Figure 7:
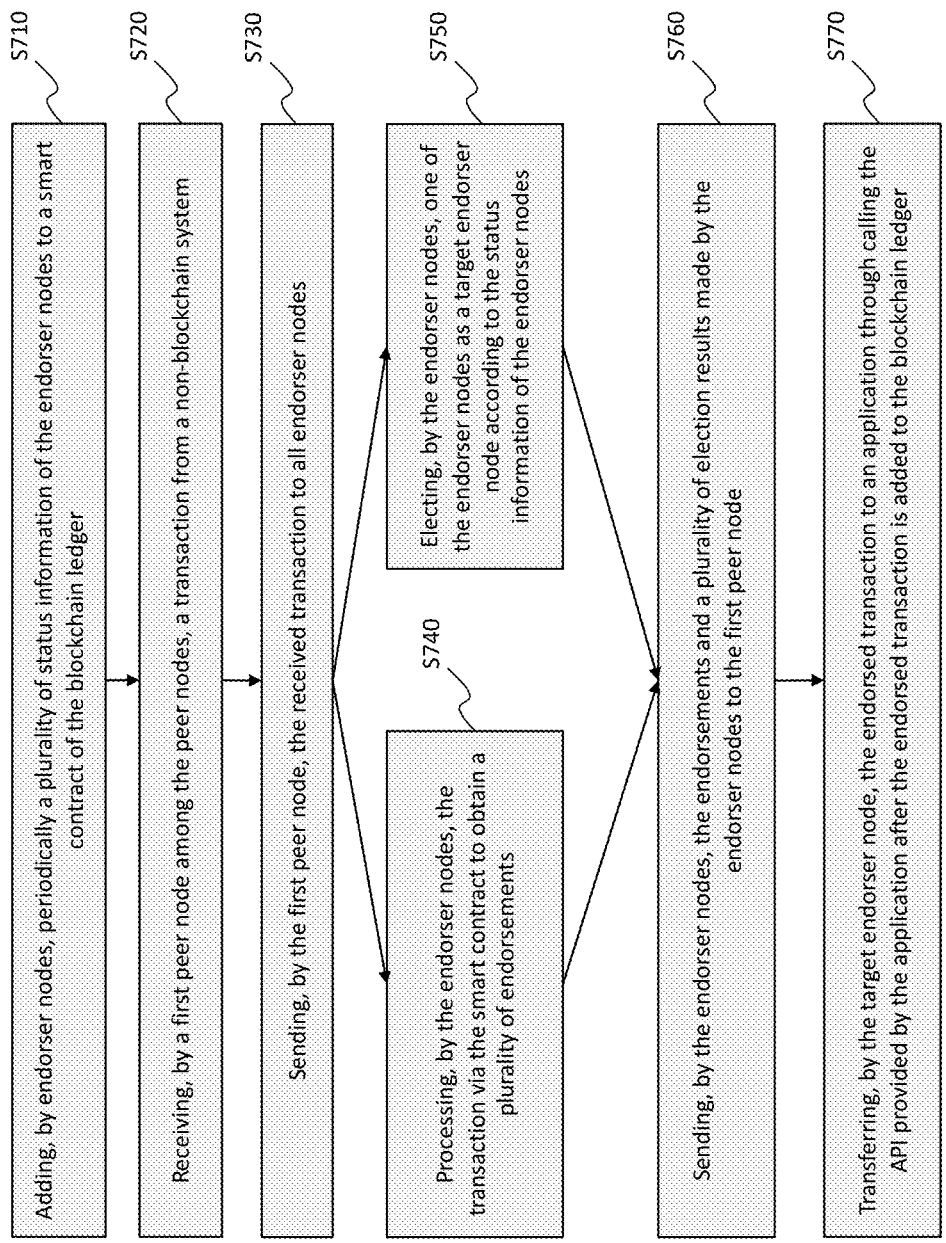
FIG. 7 depicts a flowchart of transferring a transaction received from the non-blockchain system to an application through the blockchain system.

Referring to FIG. 7 and FIG. 1 in the following description. In step S710 (the processor(s) of) the endorser nodes 120 periodically add a plurality of their status information to a smart contract SC on the blockchain ledger BL. Next, in step S720, a first peer node 110(1) among the peer nodes 110 receives a transaction TS from a non-blockchain system 200. Next, in step S730 the first peer node 110(1) sends the received transaction TS to all endorser nodes 120.

After receiving the transactions, in step S740 the endorser nodes 120 process the transaction TS via the smart contract SC to obtain a plurality of endorsements. In step S750 the endorser nodes 120 determine which one will serve as a target endorser node according to the endorser nodes' status information.

In step S760 the endorser nodes 120 send the endorsements and a plurality of their election results to the first peer node 110(1). After confirming that the endorsed transaction TS has been added to the blockchain ledger BL, in step S770 the target endorser node 120(2) transfers the endorsed transaction TS to the application 300, provided the application 300 provides a receiving mechanism (e.g., an API) for the target endorser node 120(2) to invoke the transfer (as illustrated by the dotted line in FIG. 1).

According to the above embodiment, the invention provides operation redundancy since the blockchain system 100 has multiple endorser nodes it can elect to communicate with non-blockchain system.

In addition, the invention has a low operating overhead as it does not involve a gateway that continuously queries a blockchain for new transactions.

Likewise, the invention provides a deterministic operation (e.g., step S350) to choose a node to communicate with the non-blockchain system that is specific and recorded in blockchain.

The invention does not require modifying a non-blockchain system 200, since the provided method transfers the transaction via the non-blockchain system's corresponding API, and it does not require the non-blockchain system 200 to understand or participate in blockchain protocol exchanges.

The functional units of the apparatuses and the methods in accordance to embodiments disclosed herein may be implemented using electronic devices, computer processors, or electronic circuitries including but not limited to application specific integrated circuits (ASIC), field programmable gate arrays (FPGA), and other programmable logic devices configured or programmed according to the teachings of the present disclosure. Machine instructions running in the electronic devices, computer processors, or programmable logic devices can readily be prepared by practitioners skilled in the software or electronic art based on the teachings of the present disclosure.

All or portions of the methods in accordance to the embodiments may be executed in one or more electronic devices including server computers, personal computers, laptop computers, mobile computing devices such as smartphones and tablet computers.

The embodiments include computer storage media having machine instructions stored therein which can be used to configured microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for exchanging data between a blockchain system and a non-blockchain system, wherein the blockchain system comprises one or more peer nodes, a plurality of endorser nodes, and a plurality of ordered nodes, wherein each of the nodes is configured to maintain a copy of a same one blockchain ledger of the blockchain system, comprising:
   adding, by the endorser nodes, periodically a plurality of status information of the endorser nodes to a smart contract of the blockchain ledger, wherein each of the status information comprises a unique identifier (UID) of a corresponding endorser node;
   receiving, by a first peer node among the peer nodes, a transaction from an application;
   sending, by the first peer node, the received transaction to all endorser nodes;
   processing, by the endorser nodes, the transaction via the smart contract to obtain a plurality of endorsements;
   electing, by the endorser nodes, one of the endorser nodes as a target endorser node according to the status information of the endorser nodes;
   sending, by the endorser nodes, the endorsements and a plurality of election results made by the endorser nodes to the first peer node, wherein each of the election results comprises a UID of the target endorser node determined by the corresponding endorser node; and
   transferring, by the target endorser node, the endorsed transaction to the non-blockchain system via an application programming interface (API) corresponding to the non-blockchain system after the endorsed transaction is added to the blockchain ledger.

2. The method of claim 1, further comprising:
   sending, by the first peer node, the endorsed transaction to the ordered nodes by verifying the endorsements and the election results; and
   adding, by the ordered nodes, the endorsed transaction to the blockchain ledger after the ordered nodes performing consensus operation corresponding to the endorsed transaction.

3. The method of claim 2, wherein the sending of the endorsed transaction to the ordered nodes further comprises verifying the endorsements and the election results comprising:
   determining whether a predetermined requirement is fulfilled according to the received endorsements and the election results;
   if the predetermined requirement is fulfilled, sending the endorsed transaction to the ordered nodes; and
   if the predetermined requirement is not fulfilled, instructing the application to re-send the transaction.

4. The method of claim 3, wherein the predetermined requirement comprises:
   a total number of the endorsements is not smaller than a minimum value;
   all the determined target endorser nodes are the same; and
   one of the endorsements is obtained from the target endorser node.

5. The method of claim 1, further comprising:
   adding, by the target endorser node, a transfer completed record corresponding to the endorsed transaction to the blockchain ledger after the endorsed transaction is transferred to the non-blockchain system; and
   determining, by the first peer node, whether the endorsed transaction is successfully transferred to the non-blockchain system;
   if the endorsed transaction is successfully transferred to the non-blockchain system, responding, by the first peer node, with a response to an enquiry by the application, wherein the response indicates that the transfer, across the blockchain system and the non-blockchain system, of the transaction is completed; and
   if the endorsed transaction is not successfully transferred to the non-blockchain system, instructing, by the first peer node, the application to re-send the transaction.

6. The method of claim 5, wherein the step of determining whether the endorsed transaction is successfully transferred to the non-blockchain system comprises:
   if the transfer completed record has stored in the blockchain ledger, determining, by the first peer node, that the endorsed transaction is successfully transferred to the non-blockchain system; and
   if the transfer completed record has not stored in the blockchain ledger, determining, by the first peer node, that the endorsed transaction is not successfully transferred to the non-blockchain system.

7. The method of claim 6, further comprising:
   when the endorsed transaction cannot be transferred to the non-blockchain system, adding, by the target endorser node, a transfer error record corresponding to the endorsed transaction to the blockchain ledger; and wherein the step of determining whether the transaction is transferred successfully to the non-blockchain system further comprises;

if the transfer error record has stored in the blockchain ledger, determining, by the first peer node, that the endorsed transaction is not successfully transferred to the non-blockchain system.

8. The method of claim 1, wherein the status information of each of the endorser nodes comprises:
the UID;
a network status, comprising a up status and a down status;
a network performance score; and
a last update time.

9. The method of claim 8, wherein the election of one of the endorser nodes as the target endorser node according to the status information of the endorser nodes comprises:
electing the target endorser node according to the last update time of each of the endorser nodes, the network status of each of the endorser nodes and the network performance score of each of the endorser nodes,
wherein the target endorser node meets all the following conditions comprising:
the last update time of the target endorser node is larger than a dynamic time;
the network status of the target endorser node is the up status; and
the network performance score of the target endorser node is larger than the network performance scores of other endorser nodes.

10. An apparatus for exchanging data between a blockchain system with a non-blockchain system, wherein the blockchain system comprises one or more peer nodes, a plurality of endorser nodes and a plurality of ordered nodes, comprising:
a processor corresponding to each of the nodes, configured to maintain a copy of a same one blockchain ledger of the blockchain system, and to implement a method comprising:
adding, by the endorser nodes, periodically a plurality of status information of the endorser nodes to a smart contract of the blockchain ledger, wherein each of the status information comprises a unique identifier (UID) of a corresponding endorser node;
receiving, by a first peer node among the peer nodes, a transaction from an application;
sending, by the first peer node, the received transaction to all endorser nodes;
processing, by the endorser nodes, the transaction via the smart contract to obtain a plurality of endorsements;
electing, by the endorser nodes, one of the endorser nodes as a target endorser node according to the status information of the endorser nodes;
sending, by the endorser nodes, the endorsements and a plurality of election results made by the endorser nodes to the first peer node, wherein each of the election results comprises a target UID of the target endorser node determined by the corresponding endorser node; and
transferring, by the target endorser node, the endorsed transaction to the non-blockchain system via an application programming interface (API) corresponding to the non-blockchain system after the endorsed transaction is added to the blockchain ledger.

11. A blockchain system for exchanging data with a non-blockchain system, comprising:
one or more peer nodes;
a plurality of endorser nodes; and
a plurality of ordered nodes, wherein one or more of the peer nodes, the endorser nodes and the ordered nodes are configured to maintain the same one blockchain ledger of the blockchain system,
wherein processors corresponding to nodes are further configured to execute machine instructions to implement a computer-implement method for exchanging data between the blockchain system and the non-blockchain system, comprising:
adding, by the endorser nodes, periodically a plurality of status information of the endorser nodes to a smart contract of the blockchain ledger, wherein each of the status information comprises a unique identifier (UID) of a corresponding endorser node;
receiving, by a first peer node among the peer nodes, a transaction from an application;
sending, by the first peer node, the received transaction to all endorser nodes;
processing, by the endorser nodes, the transaction via the smart contract to obtain a plurality of endorsements;
electing, by the endorser nodes, one of the endorser nodes as a target endorser node according to the status information of the endorser nodes;
sending, by the endorser nodes, the endorsements and a plurality of election results made by the endorser nodes to the first peer node, wherein each of the election results comprises a target UID of the target endorser node determined by the corresponding endorser node; and
transferring, by the target endorser node, the endorsed transaction to the non-blockchain system via an application programming interface (API) corresponding to the non-blockchain system after the endorsed transaction is added to the blockchain ledger.

12. The blockchain system of claim 11, wherein the method for exchanging data between the blockchain system and the non-blockchain system further comprising:
sending, by the first peer node, the endorsed transaction to the ordered nodes by verifying the endorsements and the election results; and
adding, by the ordered nodes, the endorsed transaction to the blockchain ledger after the ordered nodes performing consensus operation corresponding to the endorsed transaction.

13. The blockchain system of claim 12, wherein the sending of the endorsed transaction to the ordered nodes further comprises verifying the endorsements and the election results comprising:
determining whether a predetermined requirement is fulfilled according to the received endorsements and the election results;
if the predetermined requirement is fulfilled, sending the endorsed transaction to the ordered nodes; and
if the predetermined requirement is not fulfilled, instructing the application to re-send the transaction.

14. The blockchain system of claim 13, wherein the predetermined requirement comprises:
a total number of the endorsements is not smaller than a minimum value;
all the determined target endorser nodes are the same; and one of the endorsements is obtained from the target endorser node.

15. The blockchain system of claim 11, wherein the method for exchanging data between the blockchain system and the non-blockchain system further comprising:
adding, by the target endorser node, a transfer completed record corresponding to the endorsed transaction to the blockchain ledger after the endorsed transaction is transferred to the non-blockchain system; and
determining, by the first peer node, whether the endorsed transaction is successfully transferred to the non-blockchain system;
if the endorsed transaction is successfully transferred to the non-blockchain system, responding, by the first peer node, with a response to an enquiry by the application, wherein the response indicates that the transfer, across the blockchain system and the non-blockchain system, of the transaction is completed; and
if the endorsed transaction is not successfully transferred to the non-blockchain system, instructing, by the first peer node, the application to re-send the transaction.

16. The blockchain system of claim 15, wherein the step of determining whether the endorsed transaction is successfully transferred to the non-blockchain system comprises:
if the transfer completed record has stored in the blockchain ledger, determining, by the first peer node, that the endorsed transaction is successfully transferred to the non-blockchain system; and
if the transfer completed record has not stored in the blockchain ledger, determining, by the first peer node, that the endorsed transaction is not successfully transferred to the non-blockchain system.

17. The blockchain system of claim 16, further comprising:
when the endorsed transaction cannot be transferred to the non-blockchain system, adding, by the target endorser node, a transfer error record corresponding to the endorsed transaction to the blockchain ledger; and
wherein the step of determining whether the transaction is transferred successfully to the non-blockchain system further comprises;
if the transfer error record has stored in the blockchain ledger, determining, by the first peer node, that the endorsed transaction is not successfully transferred to the non-blockchain system.

18. The blockchain system of claim 11, wherein the status information of each of the endorser nodes comprises:
the UID;
a network status, comprising a up status and a down status;
a network performance score; and
a last update time.

19. The blockchain system of claim 18, wherein the election of one of the endorser nodes as the target endorser node according to the status information of the endorser nodes comprises:
electing the target endorser node according to the last update time of each of the endorser nodes, the network status of each of the endorser nodes and the network performance score of each of the endorser nodes,
wherein the target endorser node meets all the following conditions comprising:
the last update time of the target endorser node is larger than a dynamic time;
the network status of the target endorser node is the up status; and
the network performance score of the target endorser node is larger than the network performance scores of other endorser nodes.

* * * * *